(12) United States Patent
Litke

(10) Patent No.: US 7,552,308 B2
(45) Date of Patent: Jun. 23, 2009

(54) METHOD AND APPARATUS FOR TEMPORARY MAPPING OF EXECUTABLE PROGRAM SEGMENTS

(75) Inventor: Adam Gerard Litke, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 307 days.

(21) Appl. No.: 11/397,844

(22) Filed: Apr. 4, 2006

(65) Prior Publication Data

US 2007/0234002 A1 Oct. 4, 2007

(51) Int. Cl.
*G06F 12/00* (2006.01)
(52) U.S. Cl. .................. 711/202; 711/208; 711/209
(58) Field of Classification Search ................ 711/202, 711/208, 209
See application file for complete search history.

(56) References Cited

U.S. PATENT DOCUMENTS 6,490,671 B1 * 12/2002 Frank et al. .................. 711/207

2007/0294496 A1 * 12/2007 Goss et al. ................... 711/163

OTHER PUBLICATIONS

U.S. Appl. No. 11/154,159, filed Jun. 16, 2005, Burugula et al.
U.S. Appl. No. 11/127,922, filed May 12, 2005, Anand et al.
Kriz, "Varirable Block Paging for Virtual Memory", IBM Technical Disclosure Bulletin, Sep. 1984, pp. 2296-2298.
"Large Pages Using Power PC BATs", IBM Research Disclosure, Jun. 1998, pp. 841, vol. 41, No. 410, Article 410151.

* cited by examiner

*Primary Examiner*—Hyung S Sough
*Assistant Examiner*—Mehdi Namazi
(74) *Attorney, Agent, or Firm*—Yee & Associates, P.C.; Matthew W. Baca

(57) ABSTRACT

A computer implemented method, data processing system, and computer usable code are provided for managing memory use for program segments in an executable program. The process copies a set of identified executable program segments associated with the executable program to a set of page segments in a memory space. The process unmaps the set of identified executable program segments and the set of page segments. The process then remaps the set of page segments to a source memory location associated with the set of identified executable program segments.

11 Claims, 4 Drawing Sheets

FIG. 4

METHOD AND APPARATUS FOR TEMPORARY MAPPING OF EXECUTABLE PROGRAM SEGMENTS

BACKGROUND OF THE INVENTION

1. Field of the Invention

The present application relates generally to an improved data processing system and in particular to virtual memory in a data processing system. More specifically, the present application relates to an improved computer implemented method, apparatus, and computer usable program code for temporary memory mapping of executable and linking format (ELF) program segments in Linux®.

2. Description of the Related Art

When a user runs a program, the processor loads the program into random access memory (RAM), which is a temporary memory storage area in main memory. This placement of the program allows the processor to access that information. After loading the program into random access memory, the processor also loads any files that are opened for use by that program into the random access memory.

Frequently, the available amount of random access memory available in the average computer is insufficient to accommodate all of the programs and applications that a user wants to run. It is possible to add memory to increase random access memory capacity. However, purchasing additional memory can be expensive and cost prohibitive.

A majority of the information stored in random access memory is not being used at any given point in time because a processor only runs one program at a time. As a result, any programs, not being currently executed, are not used along with their associated files. Thus, the majority of random access memory is not being utilized most of the time.

Random access memory can be supplemented by moving information in random access memory that has not been recently accessed to the hard disk. Moving information from random access memory to hard disk space makes additional space in random access memory available for other programs or applications. In addition, disk space, unlike memory, is relatively inexpensive.

The technique of utilizing space on a hard disk as additional temporary memory space in order to free space in random access memory is known as "virtual memory." Virtual memory takes limited physical random access memory and turns it into an abundant resource by utilizing hard disk space. In a virtual environment, an executing process appears to have the entire address space of the central processing unit (CPU) available to that process.

Non-uniform memory access (NUMA) is a multiprocessor architecture in which each processor in a multiprocessor has its own local memory. In addition, each processor can access the memory owned by the other processors associated with the multiprocessor. In this manner, processors in a multiprocessor can share memory locally to improve performance. A processor can access its own local memory faster than it can access memory associated with another processor. Therefore, program execution and performance can be improved by copying program data to a temporary non-uniform memory access locality associated with a processor that will access the data the most frequently.

Utilizing temporary memory space, such as virtual memory space and non-uniform memory access localities for use by large applications can result in significant performance improvements. For example, other operating systems, such as the Advanced Interactive executive (AIX®) operating system, owned by International Business Machines, Inc., and Solaris® operating system, owned by Sun Microsystems, Inc., provide a feature to use large pages to store some portions of a programs memory.

However, current methods for utilizing temporary memory space to store executable programs in these other operating systems do not work on Linux® because of differences in the implementations of memory support across these different operating systems. Moreover, existing methods in Linux® for utilizing large pages by means of the existing virtual page application program interface (API) do not permit utilization of large pages for executable program segments on Linux®.

SUMMARY OF THE INVENTION

The different aspects of the illustrative embodiments provide a computer implemented method, apparatus, and computer usable program code for managing memory use for program segments in an executable program. The process copies a set of identified executable program segments associated with the executable program to a set of page segments in a memory space. The process unmaps the set of identified executable program segments and the set of page segments. The process then remaps the set of page segments to a source memory location associated with the set of identified executable program segments.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
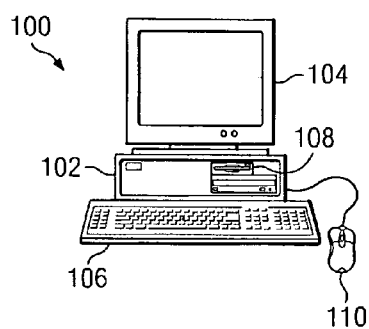
FIG. 1 depicts a pictorial representation of a data processing system in which the aspects of the illustrative embodiments may be implemented in accordance with an illustrative embodiment.

With reference now to the figures and in particular with reference to FIG. 1, a pictorial representation of a data processing system in which the aspects of the illustrative embodiments may be implemented. A computer 100 is depicted which includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like. Computer 100 can be implemented using any suitable computer, such as an IBM eServer computer or IntelliStation computer, which are products of International Business Machines Corporation, located in Armonk, N.Y. Although the depicted representation shows a computer, other embodiments may be implemented in other types of data processing systems, such as a network computer. Computer 100 may also include a graphical user interface (GUI) that may be implemented by means of systems software residing in computer readable media in operation within computer 100.

Figure 2:
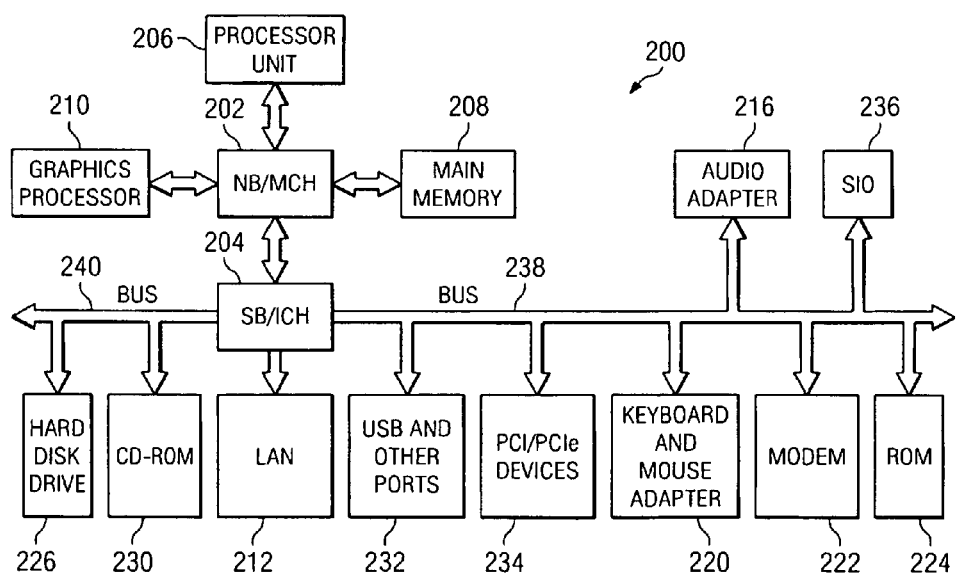
FIG. 2 depicts a block diagram of a data processing system in which aspects of the illustrative embodiments may be implemented in accordance with an illustrative embodiment.

With reference now to FIG. 2, a block diagram of a data processing system is shown in which aspects of the illustrative embodiments may be implemented. Data processing system 200 is an example of a computer, such as computer 100 in FIG. 1, in which code or instructions implementing the processes of the illustrative embodiments may be located. In the depicted example, data processing system 200 employs a hub architecture including a north bridge and memory controller hub (MCH) 202 and a south bridge and input/output (I/O) controller hub (ICH) 204. Processor unit 206, main memory 208, and graphics processor 210 are connected to north bridge and memory controller hub 202. Processor unit 206 contains a set of one or more processors. When more than one processor is present, these processors may be separate processors in separate packages. Alternatively, the processors may be multiple cores in packages. Further, the processors may be multiple multi-core units. Graphics processor 210 may be connected to the MCH through an accelerated graphics port (AGP), for example.

In the depicted example, local area network (LAN) adapter 212 connects to south bridge and I/O controller hub 204 and audio adapter 216, keyboard and mouse adapter 220, modem 222, read only memory (ROM) 224, hard disk drive (HDD) 226, CD-ROM drive 230, universal serial bus (USB) ports and other communications ports 232, and PCI/PCIe devices 234 connect to south bridge and I/O controller hub 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be connected to south bridge and I/O controller hub 204.

An operating system runs on processor unit 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 200 (Java is a trademark of Sun Microsystems, Inc. in the United States, other countries, or both).

Instructions for the operating system, the object-oriented programming system, and applications or programs are located on storage devices, such as hard disk drive 226, and may be loaded into main memory 208 for execution by processor unit 206. The processes of the illustrative embodiments are performed by processor unit 206 using computer implemented instructions, which may be located in a memory such as, for example, main memory 208, read only memory 224, or in one or more peripheral devices.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

Frequently, the available amount of random access memory available in the average computer is insufficient to accommodate all of the programs and applications that a user wants to run. It is possible to add memory to increase random access memory capacity. However, purchasing additional memory can be expensive and cost prohibitive.

Random access memory can be supplemented by moving information in random access memory that has not been recently accessed to a temporary memory space. Moving information from random access memory to a temporary memory space frees additional memory space in random access memory for utilization by other programs or applications. In addition, utilizing temporary memory space to back the memory of large applications can result in significant performance improvements.

The technique of utilizing space on a hard disk as additional temporary memory space in order to free space in random access memory is known as "virtual memory." Virtual memory takes limited physical random access memory and turns it into an abundant resource by utilizing hard disk space. In a virtual environment, an executing process appears to have the entire address space of the central processing unit (CPU) available to that process.

A page file in virtual memory is an area on a hard disk that stores information from random access memory. A segment or block of memory from random access memory is stored inside the page file as a virtual page. A system default page size is a page size for a virtual page supported by a particular operating system. A default system page size has a fixed size that is an integer power of two. For example, a default system page size can be a size of four, eight, sixteen, or thirty-two kilobytes in size. A large page is a size of a page in virtual memory that is user configured to be larger than the default system page size. A page file typically holds multiple pages. The operating system moves pages of information back and forth between the page file and the random access memory. However, existing methods in Linux® for utilizing large pages by means of the existing virtual page application program interface (API) do not permit utilization of large pages for executable program segments on Linux®.

Random access memory can also be supplemented by utilizing non-uniform memory access localities. Non-uniform memory access (NUMA) is a multiprocessor architecture in which each processor in a multiprocessor has its own local memory. In addition, each processor can access the memory owned by the other processors associated with the multiprocessor. In this manner, processors in a multiprocessor can share memory locally to improve performance. A processor can access its own local memory faster than it can access memory associated with another processor. Therefore, program execution and performance can be improved by copying program data to a temporary non-uniform memory access locality associated with a processor that will access the data the most frequently.

Therefore, the aspects of the illustrative embodiments provide a computer implemented method, apparatus, and computer usable program code for temporary memory mapping of executable and linking format (ELF) program segments in Linux®. In accordance with the aspects of the illustrative embodiments, data from a set of identified executable program segments associated with an executable program is copied to a set of page segments in a temporary memory space, such as a non-uniform memory access local page or a large page in virtual memory. The set of identified executable program segments and the set of page segments copied to a temporary memory space are unmapped. The set of page segments in temporary memory are then remapped to a source memory location associated with the original set of identified executable program segments. In this manner, memory use for executable program segments in Linux® is managed by utilizing temporary memory mapping.

The illustrative embodiments for temporary memory mapping of executable program segments are presented in the context of large pages in virtual memory and non-uniform memory access localities. However, the illustrative embodiments for managing memory use for program segments in an executable program can be applied for temporary memory mapping of executable program segments to any temporary memory space.

Figure 3:
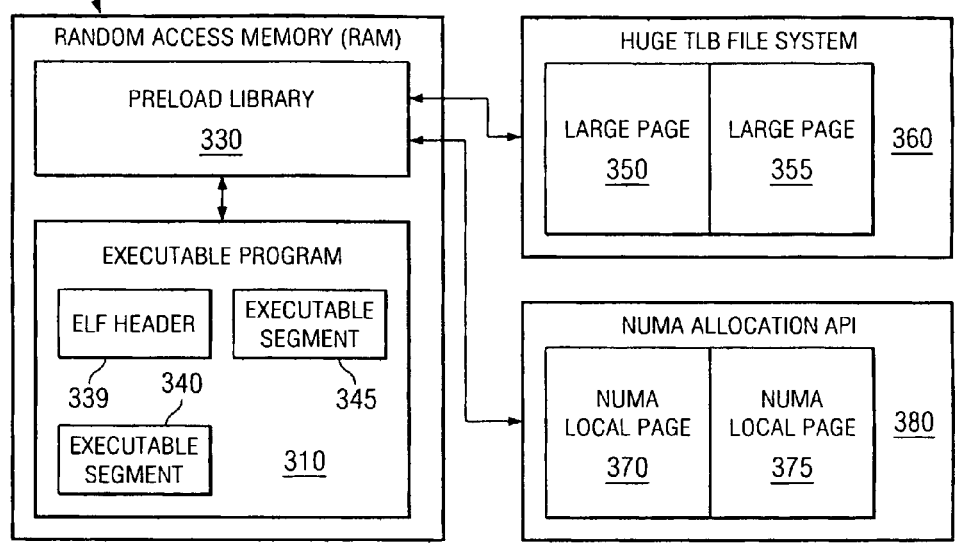
FIG. 3 depicts a functional block diagram illustrating utilization of temporary memory for storing executable program segments in accordance with an illustrative embodiment.

FIG. 3 is a functional block diagram illustrating utilization of temporary memory for storing executable program segments in accordance with an illustrative embodiment. An operating system kernel loads executable program 310 at a location in random access memory 320 specified by executable program 310 itself. Next, an operating system kernel transfers control to a loader. A loader is a computer program that copies executable files into memory and initiates execution of instructions. In accordance with this illustrative embodiment, the operating system kernel is a Linux® operating system kernel. However, the aspects of the illustrative embodiments are not limited to implementation in association with a Linux® operating system kernel.

In accordance with the illustrative embodiment shown in FIG. 3, the loader loads preload library 330 at an arbitrary memory location selected by the loader. The preload library is a library that acts as an intermediary between the Linux® operating system kernel and the loader.

Preload library 330 makes a determination as to whether executable program 310 is configured for using a set of page segments in temporary memory space for storing executable program segments based upon information in the execution and linking format header for executable program 310. If executable program 310 is not configured for utilization of page segments in temporary memory space, preload library 330 returns control of executable program 310 to executable program 310. In which case, executable program 310 is executed in main memory under control of the operating system kernel.

If preload library 330 determines that executable program 310 is configured for using a set of page segments in temporary memory space for backing or storing executable program segments, preload library 330 identifies executable program segments 340 and 345 to be backed by a set of page segments in temporary memory space based upon information in the executable and linking format header in executable program 330. As used herein, the term "a set of page segments" includes a single page, as well as two or more pages. Also as used herein, the term "executable segment" refers to both a program segment as well as a segment with executable permissions. In other words, all program segments can be remapped into temporary memory space, such as a large page in virtual memory, in accordance with the illustrative embodiments.

Executable segments 340 and 345 contain equal sized blocks or segments of program data each of which will be backed up in a single large page, such as large page 350 and 355 in huge translation lookaside buffer file system (Hugetlbfs) 360. Executable segments 340 and 345 are copied into a large page file, such as huge translation lookaside buffer file system 360. Huge translation lookaside buffer file system 360 is a virtual page file containing one or more large pages. In other words, huge translation lookaside buffer file system 360 acts as a memory allocation application programming interface for allocating large page space for large pages, such as large pages 350 and 355.

Huge translation lookaside buffer file system 360 behaves like a normal file system. For example, huge translation lookaside buffer file system files can be created, opened, closed, and deleted just as in a typical file system. Huge translation lookaside buffer file system files can also be mapped to a particular address in a program's address space. However, huge translation lookaside buffer file system files are only stored in memory and are never stored on a hard disk. Thus, huge translation lookaside buffer file system 360 is not used for permanent storage like traditional file systems. In other words, huge translation lookaside buffer file system 360 is intended for temporary use.

Program data in large pages 350 and 355 can be moved back and forth between huge translation lookaside buffer file system 360 in virtual memory and traditional random access memory 320 during execution of executable program 330.

Executable segments 340 and 345 in physical memory and large pages 350 and 355 in virtual memory, which are mapped to each other during the copying process, are unmapped. After unmapping executable segments 340 and 345 from large pages 350 and 355, large pages 350 and 355 are then remapped to the original physical memory location for executable segments 340 and 345. In this manner, when the central processing unit executes executable program 310, the central processing unit can locate the stored copies of executable program segments 340 and 345 at the original physical memory location for executable segments 340 and 345. This mapping process is illustrated in greater detail in FIG. 5.

In the alternative, executable segments 340 and 345 can be backed up or stored in a non-uniform memory access (NUMA) locality, rather than, or in addition to, backing executable segments 340 and 345 in large pages. A non-uniform memory access locality is allocated by non-uniform memory access allocation application program interface (NUMA allocation API) 380. Non-uniform memory access allocation application program interface 380 is a memory allocation application program interface that allocates a non-uniform memory access local page space for local pages, such as non-uniform memory access local pages 370 and 375, for storing a copy of each executable segment to be backed in a non-uniform memory access locality. Executable segments 340 and 345 are copied into non-uniform memory access local pages 370 and 375.

Executable segments 340 and 345 in physical memory and non-uniform memory access local pages 370 and 375 in a non-uniform memory access locality are then unmapped. After unmapping executable segments 340 and 345 from non-uniform memory access local pages 370 and 375, non-uniform memory access local pages 370 and 375 are then remapped to the original physical memory location for executable segments 340 and 345. In this manner, when the central processing unit executes executable program 310, executable program segments 340 and 345 in the non-uniform memory access locality can be found by the central processing unit at the original physical memory location for executable segments 340 and 345. This mapping process is illustrated in greater detail in FIG. 5.

Figure 4:
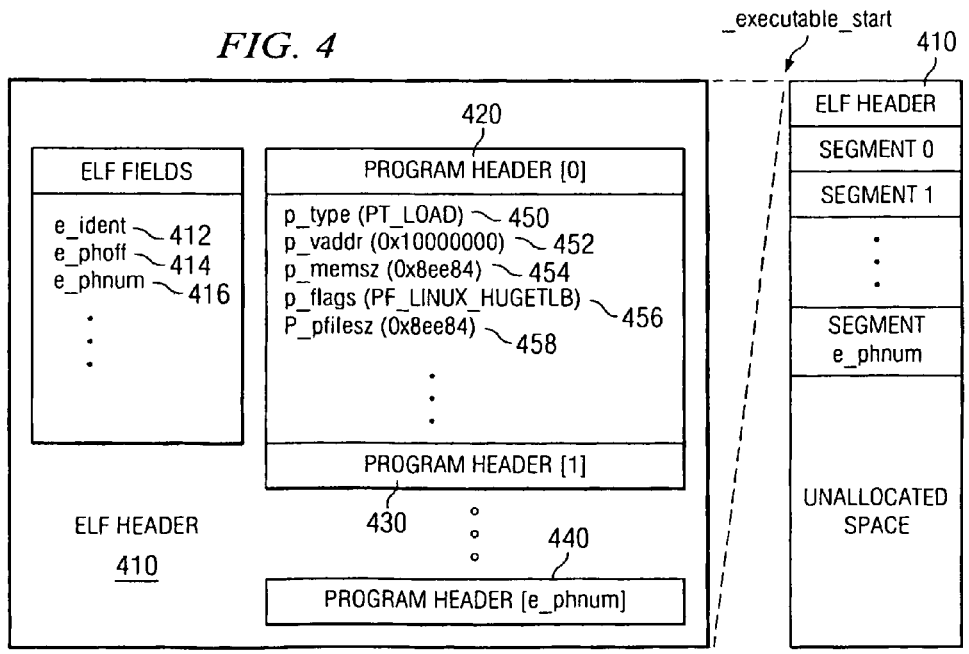
FIG. 4 depicts a block diagram illustrating an executable and linking format (ELF) header in accordance with an illustrative embodiment.

FIG. 4 is a block diagram illustrating an executable and linking format (ELF) header in accordance with an illustrative embodiment. Executable and linking format header 410 specifies a memory layout of an executable program in memory. The executable and linking format header 410 describes how segments of the program are mapped into memory. Executable and linking format fields 412, 414, and 416 provide global information regarding an executable program. For example, e_ident 412 is a standard string that is utilized by a preload library, such as preload library 310 in FIG. 3, to verify executable and linking format 410 is a valid executable and linking format header. The preload library can look at e_ph_off 414 to determine an offset for program header. The e_ph_off field specifies the offset in bytes from the start of the executable and linking format (ELF) header where the first program header can be found. The preload library utilizes field e_phnum 416 to determine how many program segments, such as program header [0] 420 and program header [1] 430. An executable program may contain any number of program segments ranging from program header [0] 410 to program header [e_phnum] 440. The number of program segments is identified by field e_phnum 416.

Program header [0] 420 is an exemplary illustration of information provided in an executable and linking format header regarding a particular executable program segment. Field p_type 450 specifies the type of program segment represented by this program header. Possible types include PT_LOAD, PT_DYNAMIC, PT_INTERP, PT_NOTE, etc. The preload library is only interested in segments of type PT_LOAD. In this illustrative example, p_type 450 for segment [0] and p_type 460 for segment [1] are both type PT_LOAD. Therefore, when the preload library scans the executable and linking format program header for segment [0] 420 and segment [1] 430, the preload library will not ignore segments [0] and [1].

Field p_flags 456 provides the preload library with information regarding remapping of the segment in large pages. In particular, field 456 indicates whether program segment associated with program header[0] 420 should be remapped in large pages. In this illustrative example, p_flags is set to PF_LINUX_HUGETLB indicates that segment [0] should be backed in large pages. Thus, if the p_type flag is not set to PT_LOAD or the p_flags is not set to PF_LINUX_HUGETLB then the segment would not be backed in large pages.

Field p_filesz 458 indicates a value utilized by the preload library to derive a copy size for program segment associated with program header [0] 420. Field p_vaddr 452 provides preload library with a start address for a program segment. In this illustrative example, segment [0] p_vaddr 452 is 0x100000000. Field p_memsz 454 provides the preload library with information regarding the size of program segment [0] 520. In this illustrative example, p_memsz indicates that segment [0] is 0x8ee84 bytes in size. Thus, when preload library copies program segment [0] into a large page, preload library will first map program segment [0] at location 0x10000000 to temporary memory location 0xe0000000000. Preload library then copies 0x8ee84 bytes of data from location 0x10000000 to temporary memory location 0xe0000000000. The memory map at 0xe0000000000 is then unmapped.

The fields shown in executable and linking format header 410 are not an exhaustive list of all information regarding executable program segments that can be included in an executable and linking format header. Other fields may also be included in an executable and linking format header. In accordance with another illustrative embodiment, all fields, such as fields 412-416 and 450-456, are specified in accordance with the executable and linking format header.

As briefly discussed above, the preload library reads an executable and linking format header for an executable program to determine which executable linking and format segments have been loaded into memory and to identify which segments are to be backed by large pages. The preload library makes this determination based upon a flag set in the header of the executable segment.

The preload library retains a variety of information regarding the identified segments to be backed by large pages, including the start address, the length in memory, the length on disk, and protection flags. The start address is a pointer to the location of the beginning of the identified segment. The length in memory is the number of bytes in the identified segment. The preload library utilized the length on disk to derive a copy size for a copy of the identified segment.

The preload library prepares identified segments for remapping by calculating two sizes, the copy size and the map size. The copy size is equal to the on-disk size of the segment. The map size is equal to the memory size of the segment rounded up to a multiple of the large page size. The copy size and map size can be calculated by the preload library from the information in the executable and linking format (ELF) header.

The preload library opens a file in huge translation lookaside buffer file system by means of the huge translation lookaside buffer application program interface (API) available through the Linux® kernel. The preload library unlinks the huge translation lookaside buffer file. The preload library then stores a file descriptor with information collected about the identified segments.

The preload library creates a memory map in unallocated space using the huge translation lookaside buffer file and the map size information. The preload library copies the contents of the identified segments to the temporary large page mapping. The preload library unmaps all affected program segments and large pages.

The preload library creates a memory map for each segment using the respective hugetlb files and map size information. The preload library maps each segment one at a time to conserve memory during this process. For example, for each segment that requires remapping, the preload library creates a mapping using hugetlb file and size. Data from the executable program segment is copied to the mapping. The preload library then unmaps the mapping. Then, the preload library unmaps each original segment.

Finally, the preload library remaps the large pages in the huge translation lookaside buffer file back to the physical memory location for the identified executable segments. The preload library accomplishes this by instructing the Linux® kernel to place the large pages mapping in the exact same virtual memory location as the original identified executable segments. In this manner, the Linux® kernel can locate the large pages containing the copies of the identified executable segments in the same memory location that the kernel expects to find the original identified executable segments. Thus, all of the executable program segments are mapped at the same memory address in which the executable program segments were located prior to backing the segments in large pages.

Figure 5:
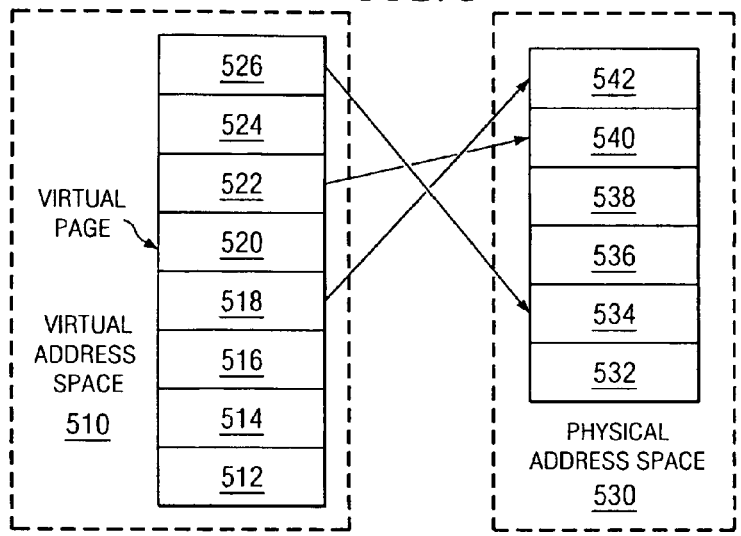
FIG. 5 depicts a block diagram illustrating mapping of large pages to a physical memory address for the corresponding executable segments in accordance with an illustrative embodiment.

FIG. 5 is a block diagram illustrating mapping of large pages to a physical memory address for the corresponding executable segments in accordance with an illustrative embodiment. Virtual address space 510 is divided into equal sized segments or blocks referred to a pages or large pages, such as pages 512-526. Physical address space 530 is divided into equal sized pieces in physical memory referred to as page frames, such as page frames 532-542.

Each virtual page is mapped to a page frame in physical memory so that the Linux® kernel is able to retrieve the data stored in a virtual page as if the virtual page data were actually stored in real memory. For example, in this illustrative example, page 518 is mapped to physical memory 542 and page 522 is mapped to a physical memory address for page frame 540. When preload library instructs the kernel to place the large pages mapping at the same location as the original executable segments, the kernel is able to retrieve the data in the large pages as if the data were stored in the memory location designated for the original executable segments. In this manner, the preload library ensures that data backed in large pages is locatable by the kernel when needed.

Figure 6:
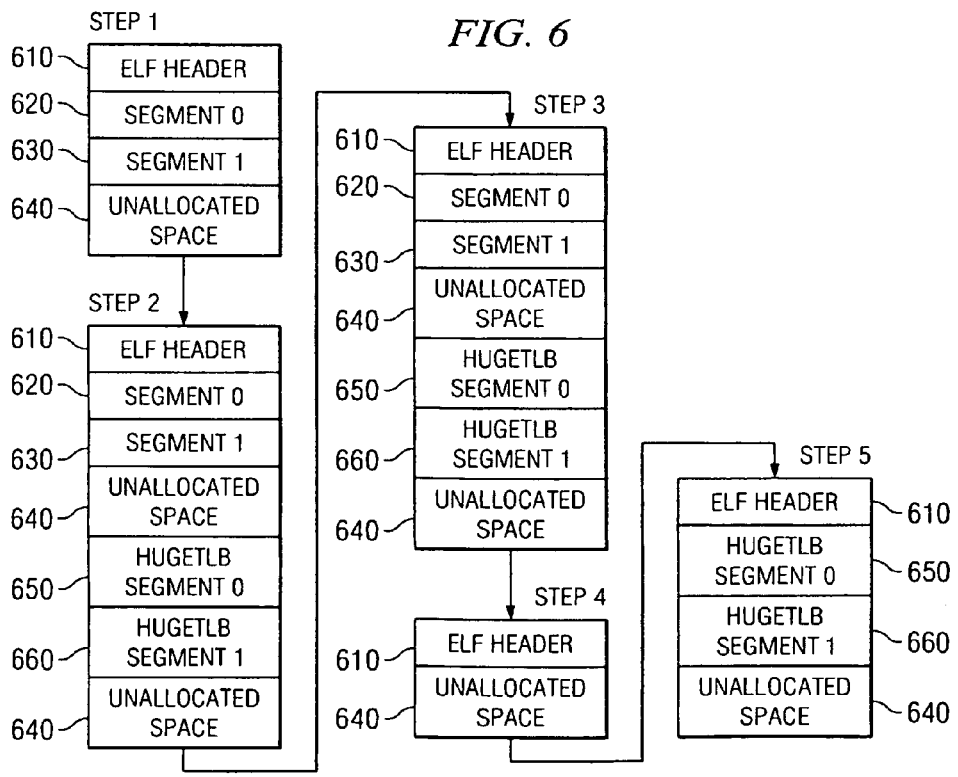
FIG. 6 depicts a block diagram of the operation performed by a preload library in accordance with an illustrative embodiment.

FIG. 6 is an exemplary block diagram of the operation performed by a preload library in accordance with an illustrative embodiment. At step 1, the preload library begins execution of the executable program having executable and linking format header 610. The executable program has two segments, segment 0 620 and segment 1 630 stored in main memory. Unallocated space 640 is space in the virtual address space of the process that is not represented in the executable and linking format (ELF) header. Unallocated space is memory space that has not been allocated for use by another application or process. Unallocated space is assumed to be unused memory space.

The preload library examines executable and linking format header 610 to determine the memory layout for the executable program.

At step 2, the preload library creates a huge translation lookaside buffer (hugetlb) area 650 and 660 for executable segments 620 and 630 in the unallocated space 640. At step 3, the contents of segment 0 620 and segment 1 630 are copied to huge translation lookaside buffer segment 0 650 and huge translation lookaside buffer segment 1 660, respectively. At step 4, preload library unmaps segments 620, 630, 650, and 660. The huge translation lookaside buffer segments 650 and 660 remain available in a kernel cache after unmapping of segments 650 and 660. Unlinking an open file causes a convenient side effect whereby the large page memory used to back the file will be automatically cleaned up by the kernel when the executable program exits. These copies of segments 650 and 660 in kernel cache are utilized by the preload library to map huge translation lookaside buffer segments 650 and 660 to the physical memory location originally designated as a physical memory location for executable program segments 620 and 630 at step 5.

Figure 7:
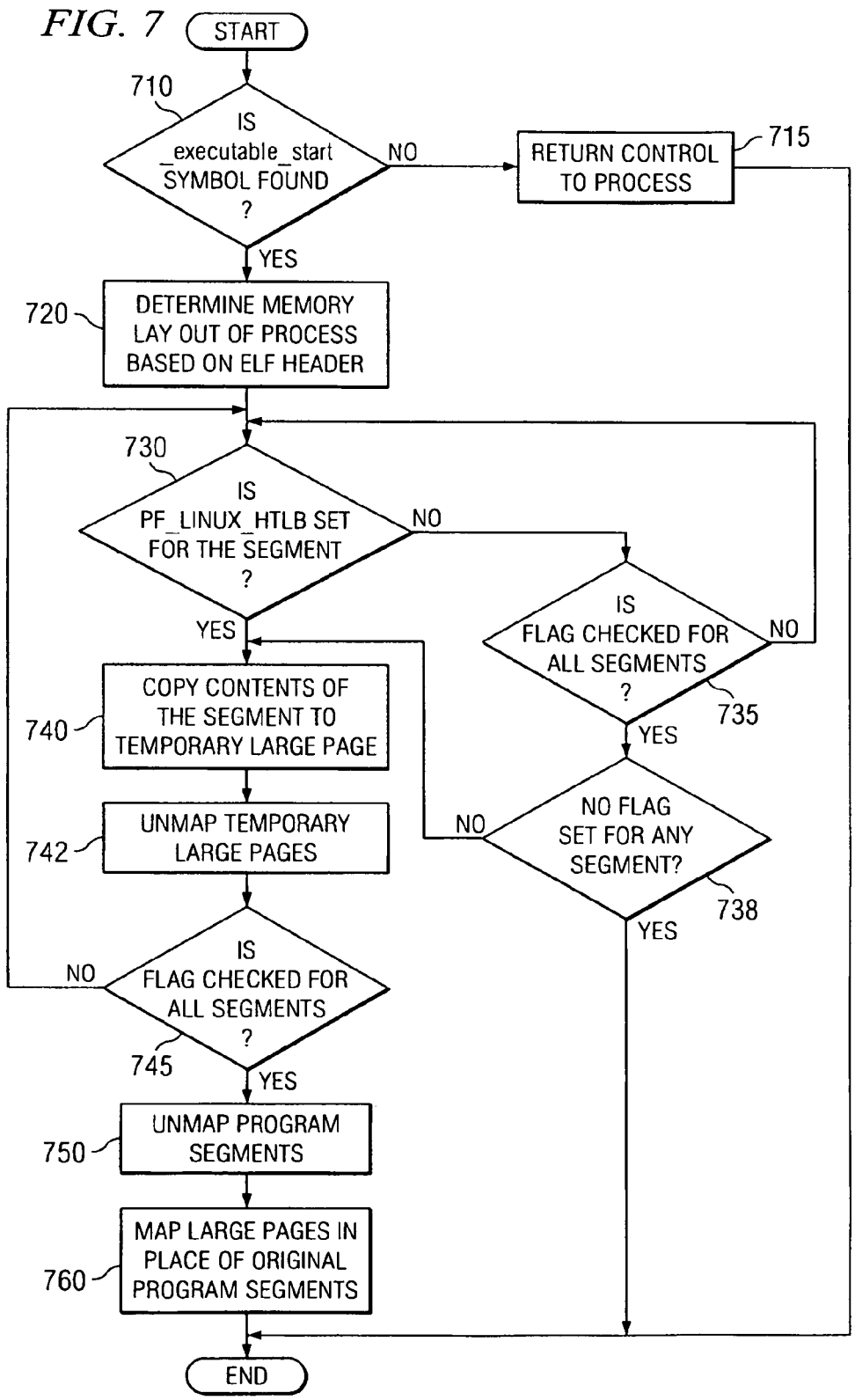
FIG. 7 depicts a flow chart of the operation performed by a preload library in accordance with an illustrative embodiment.

FIG. 7 is a flow chart of the operation performed by a preload library in accordance with an illustrative embodiment. The illustrated process is carried out by a preload library, such as preload library 310 in FIG. 3 in these examples.

The process begins with preload library determining whether an _executable_start symbol is found in an executable and linking format header for an executable program (step 710). If the _executable_start symbol is not found, the executable program has not been configured for utilization of large pages and control is returned to the program (step 715). The process terminates thereafter.

If the _executable_start symbol is found indicating that the executable program is configured for utilization of large pages, the preload library determines a memory layout for the process based upon the executable and linking format (ELF) header associated with the program (step 720). The preload library then determines whether a PF_LINUX_HTLB flag is set in the executable and linking format header for each segment to determine if each segment is to be backed by large pages (step 730). If the preload library determines that a flag is not set, the preload library determines if the PF_LINUX_HTLB flag has been checked for all segments (step 735). If the PF_LINUX_HTLB flag has not been checked for all segments, the process returns to step 730 until the preload library determines that a flag has been checked for all segments.

The preload library then determines if no flag is set for any segment indicating that a segment is to be backed by large pages (step 738). If a determination is made that no flag is set for any segment, the process terminates thereafter. However, if a flag is set for any segment indicating a segment to be backed by large pages, the preload library copies the contents of the segment to a temporary large page corresponding to that segment (step 740).

Returning now to step 730, if the preload library determines that a flag is set for a segment, the preload library copies the contents of the segment to a temporary large page (step 740). The preload library unmaps the temporary large pages (step 742). Next, the preload library then determines if the flag has been checked for all segments (step 745). If the flag has not been checked for all segments, the process returns to step 730. If the flag has been checked for all segments, the preload library unmaps all temporary large pages and program segments (step 750). After copying the data to the temporary large page mapping, the temporary large page mapping is unmapped before checking if the flag is set for the next segment. This conserves space in the virtual address space by ensuring that not more than one temporary mapping occupies space in the virtual address space at one time. The preload library then maps the large pages in place of the original program segments (step 760). The process terminates thereafter.

The key to virtual memory mapping is that the physical memory addresses of large pages used to back the segments are different than the original pages used to back the segments. But that difference doesn't matter to the program or the kernel so long as the virtual addresses are the same as the original executable program segment virtual memory address. Thus, when the executable program is being executed in main memory by the central processing unit, the central processing unit will be able to locate the large pages containing the executable segments at the same memory address where the central processing unit expects to find the executable segments.

The aspects of the illustrative embodiments permit executable program segments to be backed in large pages. Utilization of large pages in this manner can provide significant performance improvements. The illustrative embodiments allow utilization of large pages for executable and linking format (ELF) program segments on Linux® by reading the executable and linking format header for executable programs and utilizing existing Linux® huge translation lookaside buffer application programming interfaces. Thus, the illustrative embodiment permits utilization of large pages to back an executable program without requiring alteration or modification of the executable program's source code.

The flowchart and block diagrams in the figures illustrate the architecture, functionality, and operation of some possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the illustrative embodiments has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for managing memory use for program segments in an executable program for a specified operating system, the computer implemented method comprising:

loading an executable program at a location in random access memory, wherein the location is specified by the executable program;

transferring control of the executable program to a loader, wherein an operating system kernel transfers the control to the loader, wherein the operating system kernel is configured for the specified operating system;

identifying a set of executable program segments to form a set of identified executable program segments to be copied into a set of large pages based upon information in an executable and linking format header for the executable program, wherein the information comprises a set of flags located in the executable and linking format header, wherein the set of flags indicate that the set of executable program segments located on the specified operating system are configured for copying into the set of large pages, and wherein a preload library is used to identify the set of executable program segments, wherein the preload library comprises a library that acts as an intermediary between the specific operating system kernel and the loader;

calculating a copy size and a map size for each executable program segment in the set of executable program segments prior to copying the set of executable program segments into the set of large pages;

copying content from the set of identified executable program segments associated with the executable program to the set of large pages located in a huge translation lookaside buffer file system, wherein the huge translation lookaside buffer file system acts as a memory allocation application programming interface for allocating space in the set of large pages for the specified operating system;

unmapping the set of identified executable program segments;

unmapping the set of large pages; and remapping the content of the set of large pages located in the huge translation lookaside buffer file system, wherein the preload library instructions the operating system kernel to map the set of identified executable program segments in an original memory address associated with the set of identified executable program segments prior to the copying of the set of identified executable program segments to the set of large pages.

2. The computer implemented method of claim 1, wherein the set of large pages comprises a size of a page in the set of page segments in virtual memory that is larger than a default system page size.

3. The computer implemented method of claim 1, wherein the content is copied to a non-uniform memory access locality.

4. The computer implemented method of claim 3 wherein the non-uniform memory access locality is allocated by a non-uniform memory access allocation application program interface.

5. The computer implemented method of claim 1 further comprising:

creating a set of page areas in an unallocated temporary memory space in virtual memory by a memory allocation application program interface.

6. The computer implemented method of claim 1 wherein a copy of a set of page segments remain in a kernel cache after the set of page segments are unmapped, and wherein the set of page segments are remapped to a source memory location associated with the set of identified executable program segments utilizing the copy of the set of page segments in the kernel cache.

7. A computer program product stored in a recordable-type computer useable medium including computer usable program code for managing memory use for program segments in an executable program for a specified operating system, the computer program product comprising:

computer useable program code for loading an executable program at a location in random access memory, wherein the location is specified by the executable program;

computer useable program code for transferring control to a loader, wherein an operating system kernel transfers the control to the loader, wherein the operating system kernel is configured for the specified operating system;

computer useable program code for identifying a set of executable program segments to form a set of identified executable program segments to be copied into a set of large pages based upon information in an executable and linking format header for the executable program, wherein the information comprises a set of flags located in the executable and linking format header, wherein the set of flags indicate that the set of executable program segments located on the specified operating system are configured for copying into the set of large pages, and wherein a preload library is used to identify the set of executable program segments, wherein the preload library comprises a library that acts as an intermediary between the specific operating system kernel and the loader;

computer useable program code for calculating a copy size and a map size for each executable program segment in the set of executable program segments prior to copying the set of executable program segments into the set of large pages;

computer useable program code for copying content from the set of identified executable program segments associated with the executable program to the set of large pages located in a huge translation lookaside buffer file system, wherein the huge translation lookaside buffer file system acts as a memory allocation application programming interface for allocating space in the set of large pages for the specified operating system;

computer useable program code for unmapping the set of identified executable program segments;

computer useable program code for unmapping the set of large pages; and computer usable program code for copying the content of the set of large pages located in the huge translation lookaside buffer file system, wherein the preload library instructions the operating system kernel to map the set of identified executable program segments in an original memory address associated with the set of identified executable program segments prior to the copying of the set of identified executable program segments to the set of large pages.

8. The computer program product of claim 7, wherein the set of large pages comprises a size of a page in the set of page segments in virtual memory that is larger than a default system page size.

9. The computer program product of claim 7 wherein the content is copied to a non-uniform memory access locality.

10. The computer program product of claim 9 wherein the non-uniform memory access locality is allocated by a non-uniform memory access allocation application program interface.

11. An apparatus for managing memory use for program segments in an executable program for a specified operating system, the apparatus comprising:

a bus system;

a communications system coupled to the bus system;

a memory connected to the bus system, wherein the memory includes computer useable program code; and a processing unit, wherein the processor unit executes the computer usable program product to load an executable program at a location in random access memory, wherein the location is specified by the executable program; to transfer control of the executable program to a loader, wherein an operating system kernel transfers the control to the loader, wherein the operating system kernel is configured for the specified operating system; to identify a set of executable program segments to form a set of identified executable program segments to be copied into a set of large pages based upon information in an executable and linking format header for the executable program, wherein the information comprises a set of flags located in the executable and linking format header, wherein the set of flags indicate that the set of executable program segments located on the specified operating system are configured for copying into the set of large pages, and wherein a preload library is used to identify the set of executable program segments, wherein the preload library comprises a library that acts as an intermediary between the specific operating system kernel and the loader; to calculate a copy size and a map size for each executable program segment in the set of executable program segments prior to copying the set of executable program segments into the set of large pages; to copy content from the set of identified executable program segments associated with the executable program to the set of large pages located in a huge translation lookaside buffer file system, wherein the huge translation lookaside buffer file system acts as a memory allocation application programming interface for allocating space in the set of large pages for the specified operating system; to unmap the set of identified executable program segments; to unmap the set of large pages; and to remap the content of the set of large pages located in the huge translation lookaside buffer file system, wherein the preload library instructions the operating system kernel to map the set of identified executable program segments in an original memory address associated with the set of identified executable program segments prior to the copying of the set of identified executable program segments to the set of large pages.

* * * * *